Jan. 13, 1959 G. E. SUDEROW 2,868,565
RELEASABLE PIVOTED CLAMP FOR JOINING INTERNALLY
FLANGED STRUCTURAL MEMBERS
Filed May 1, 1956 3 Sheets-Sheet 1

INVENTOR.
George E. Suderow
By
ATTORNEYS

Jan. 13, 1959 G. E. SUDEROW 2,868,565
RELEASABLE PIVOTED CLAMP FOR JOINING INTERNALLY
FLANGED STRUCTURAL MEMBERS
Filed May 1, 1956 3 Sheets-Sheet 2
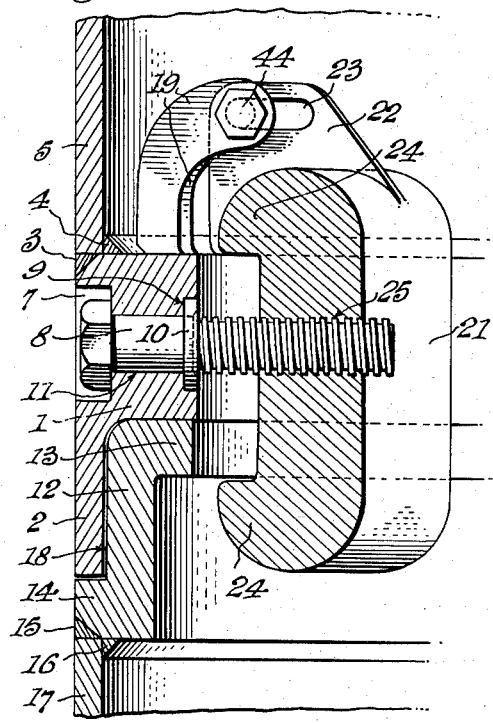
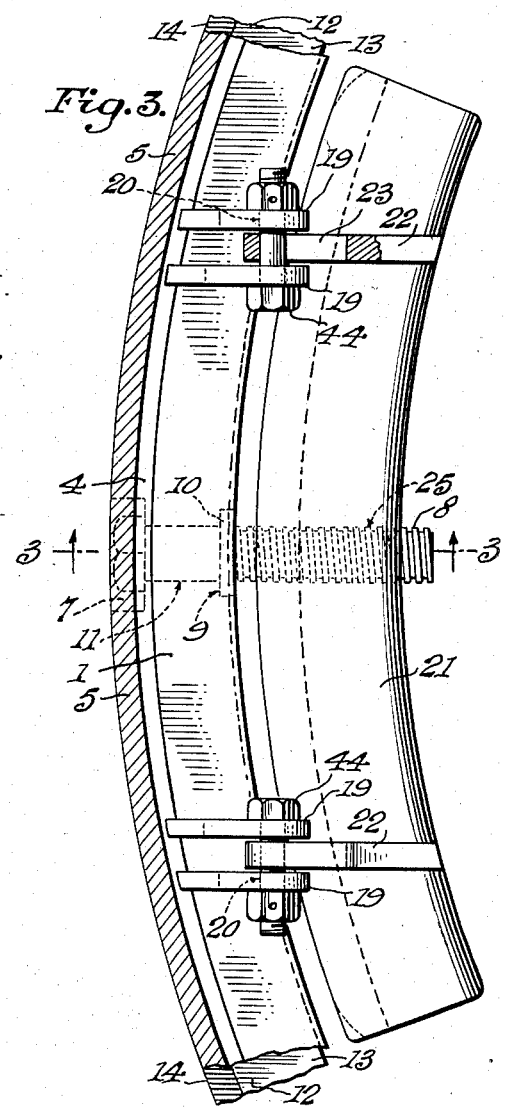
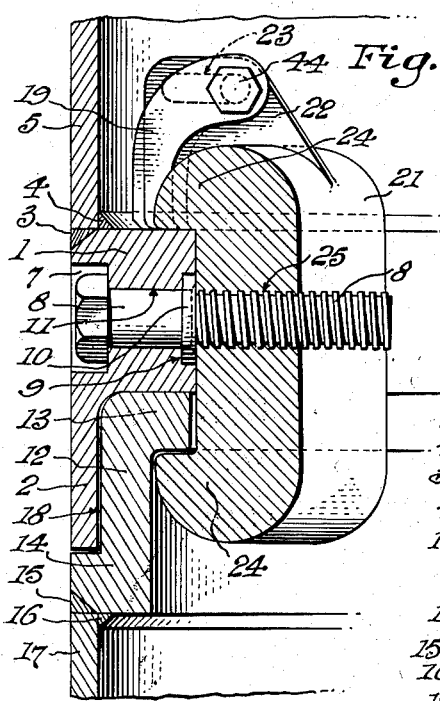
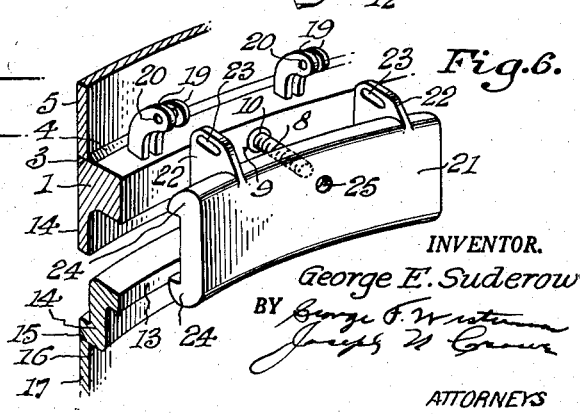
INVENTOR.
George E. Suderow
BY
ATTORNEYS

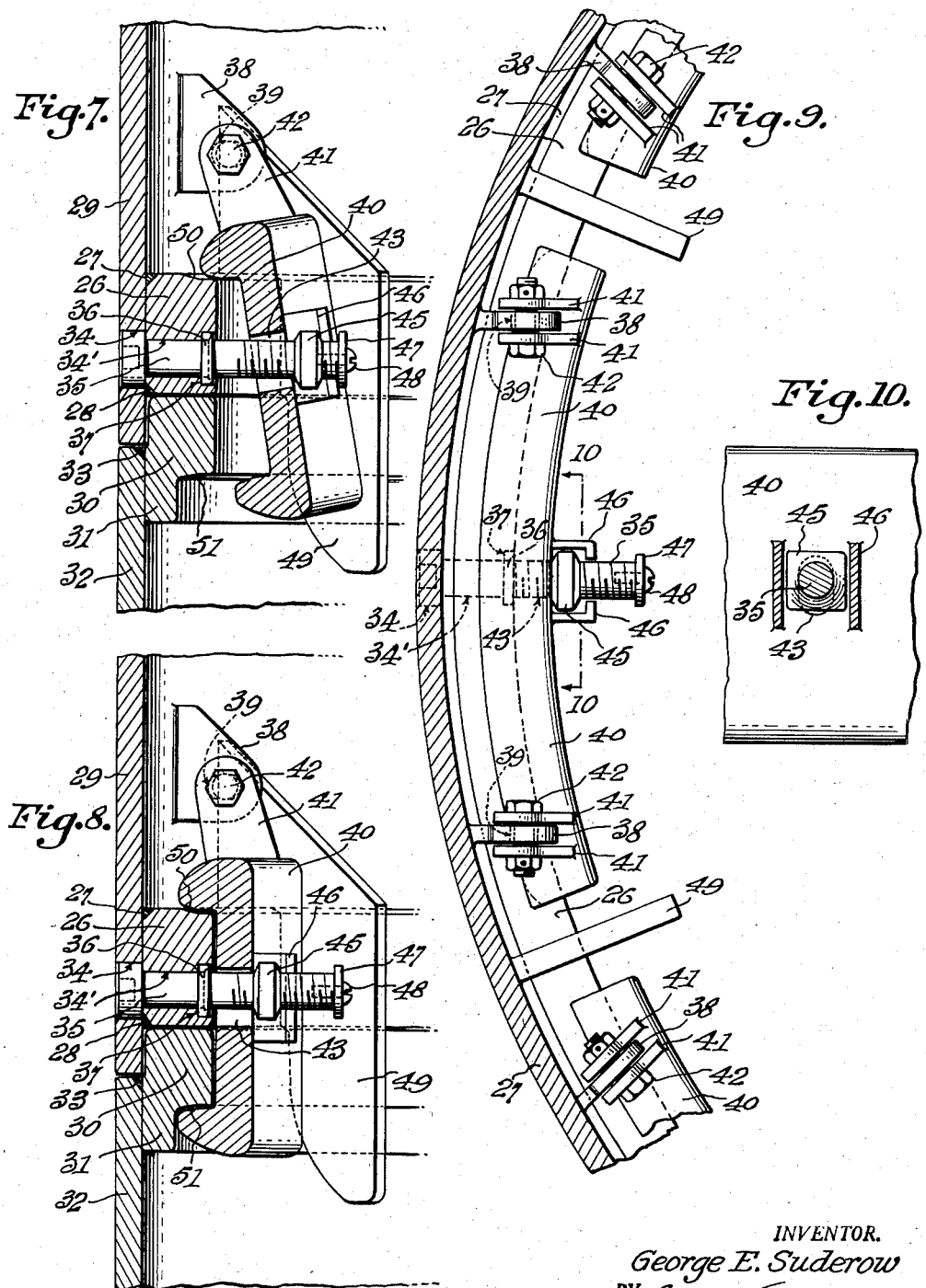

United States Patent Office 2,868,565
Patented Jan. 13, 1959

2,868,565

RELEASABLE PIVOTED CLAMP FOR JOINING INTERNALLY FLANGED STRUCTURAL MEMBERS

George E. Suderow, Staten Island, N. Y., assignor to the United States of America as represented by the Secretary of the Army Application May 1, 1956, Serial No. 582,057

2 Claims. (Cl. 285—308)

This invention relates to a mechanical connector for joining structural members and more particularly to a connector for joining tubular sectional units or segments of hollow structures and panels in edgewise relation. The connector involves a novel arrangement of flanges and translatable or pivoted clamps enabling the structures to be easily assembled and disassembled while at the same time insuring that a rigid connection is produced which is able to withstand great stress when assembled.

The caissons for which these structural connectors were primarily designed are used in connection with large, stationary off-shore barges. These barges are towed to a desired location and there, with the use of hydraulic jacks, caissons in 50 or 100 foot length are driven downward through openings in the sides of the barge into the ocean bed. The jacks operate by gripping the caissons and forcing them downward. This action requires that the caissons afford a surface that is devoid of any projections. At refusal, the action of the jacks continues and the barge is lifted out of the water to the desired height. Depending upon the depth of the water and the quality of the ocean bed, several lengths of caisson may be required for each supporting column.

Heretofore these lengths have been welded together, and such a connection has assured a strong and positive bond of the type needed. However, when the barge is ultimately moved, the caissons have had to be abandoned, or in the alternative, there is required a costly and time-consuming dismantling of the welded lengths. In military operations, where the barges are to be used as temporary unloading docks, such dismantling is not feasible and the result is a total loss of the high-grade steel caissons. The solution to such a problem is to provide a releasable connector which makes a strong union in assembly and yet is easily assembled and quickly and inexpensively disassembled. Because of the manner in which the hydraulic jacks engage the caissons, such connector must present a surface that is flush with the common plane of the sections to be assembled.

It is therefore a general object of this invention to provide a releasable connector for caissons and other structures that is rugged in construction and which can be operated from an accessible point on the structure once the associated sections are arranged in juxtaposition.

A further object of the invention is to provide a structural connector whereby the assembly is easily disconnected but which when assembled provides a strong bond not subject to failure or unintentional release.

A further object of the invention is to provide a releasable structural connector that is easily and quickly assembled without special tools or equipment.

A further object of the invention is to provide a releasable structural connector which precludes the need for welds, rivets, or screws in final assembly.

A further object of the invention is to provide a structural connector which in final assembly presents a smooth exterior surface in a common plane with the sections connected.

Other objects and advantages of the invention will appear in the following description and drawings, in which:

Fig. 3 is a plan view partly in section showing a slidably mounted channel segment positioned on a section of the caisson;

Fig. 4 is a detailed vertical sectional view taken on the line 3—3 of Fig. 3 showing the connector elements in open position;

Fig. 5 is detailed vertical sectional view similar to Fig. 4, showing the connector in a closed position;

Fig. 6 is an exploded view of a slidably mounted channel segment of the connector in Fig. 3;

Fig. 7 is a detailed vertical sectional view of another embodiment showing a hinged channel segment connector in open position;

Fig. 8 is a view similar to Fig. 7 showing the connector in a closed position;

Fig. 9 is plan view partly in section showing a hinged channel segment positioned on a section of the caisson; and Fig. 10 is a view taken on the line 10—10 of Fig. 9.

Figure 1:
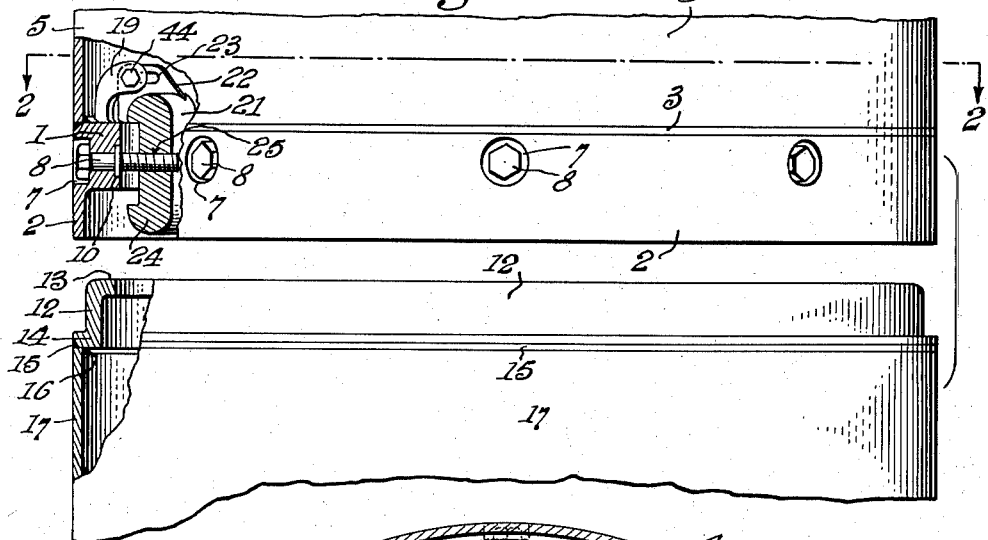
Fig. 1 is a side elevation partly in section of two caisson sections prior to assembly showing elements of one embodiment of a structural connector.
Figure 2:
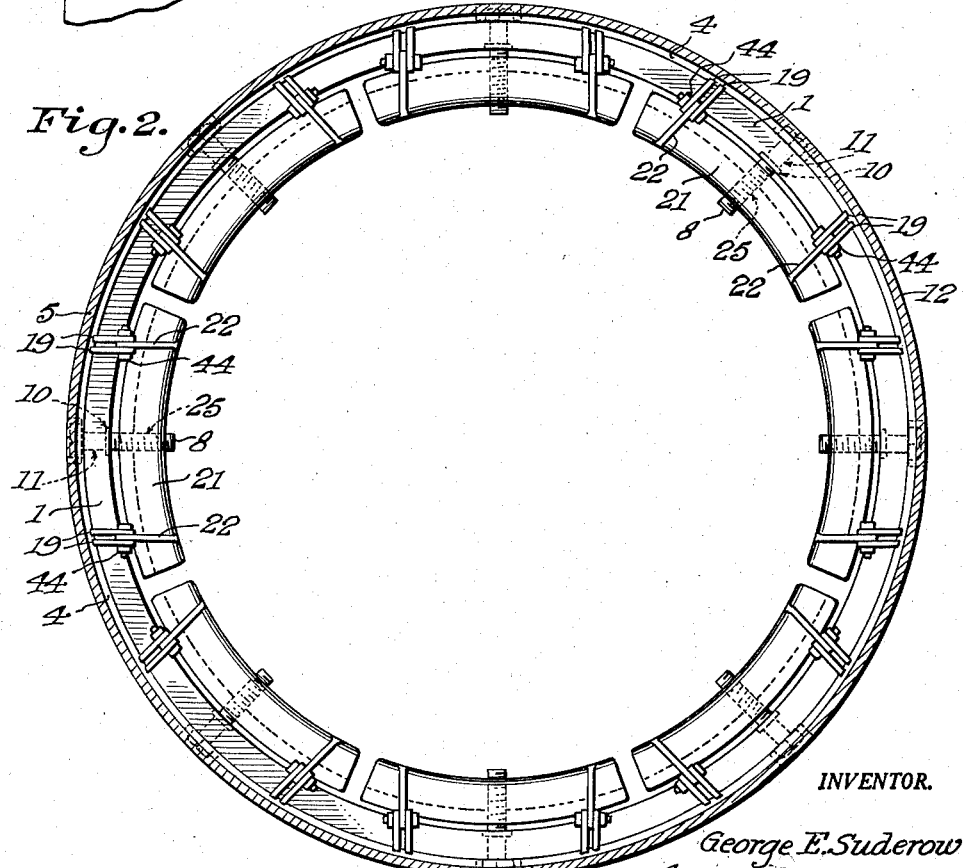
Fig. 2 is a view taken on the line 2—2 of Fig. 1.

Referring more particularly to the drawings, the connector shown in Figs. 1 through 6 is the preferred form of the invention and is used for connecting two cylindrical columns or caissons.

A ring 1 having a depending flange 2 integral therewith is welded as at 3 and 4 to one end 5 of a caisson section 6. The flange 2 is of lesser thickness than the ring 1 and co-extensive with the outer peripheral surface of the ring 1. The ring 1 is provided on its outer periphery with a plurality of spaced, horizontally aligned recesses 7 to permit the heads of machine bolts 8 to lie flush with the outer surface of the assembled caisson structure. The ring 1 also is provided with recesses 9 on its inner surface to receive washers 10 welded to the bolts 8. The washers 10 are welded to the bolts 8 after the bolts 8 have been passed through the bores 11 in the ring 1 prior to bringing the upper and lower caisson sections into engagement and may be done at the time the ring 1 is welded to a section of the caisson. A circular member 12 having oppositely directed upper and lower flanges 13 and 14, respectively, integral with the circular member 12, adjacent the upper and lower edges thereof, is welded as at 15 and 16 to one end of a caisson section 17 so that the outwardly directed face of the lower flange 14 is flush with the outer surface of the caisson 17. The flange 14 and the circular member 12 form a notch 18 which receives the flange 2 when the caisson sections 6 and 17 are in assembled condition. Pairs of mutually spaced longitudinal arms 19 are attached to or integrally formed on the upper flat surface of the ring 1 in predetermined locations. The arms 19 have holes 20 at the upper ends thereof. Arcuate segments 21 having a channel-shaped cross-section are provided with flat ears 22 extending in a plane normal to the lengthwise direction of the arcuate segments 21 and are located at suitable intervals along one leg 24 of the channel-shaped arcuate segments 21. Threaded holes 25 are located so they may be aligned with the recesses 7 and 9 and bores 11 as required in the arcuate segments 21 to receive the bolts 8. Ears 22 are provided with elongated openings 23. When in assembled condition, the ears 22 are positioned between the pairs of arms 19 by bolts 44 in a manner to permit movement toward or away from the caisson wall as the bolts 8 are tightened or loosened. As the bolts 8 associated with each segment are tightened from the exterior surface of the caisson, the legs 24 of the channel-shaped arcuate segment engage the upper surface of ring 1 and upper flange 13 of circular member 12 and draw the caisson sections together to form with the releasable connector elements a continuous column. The curved meeting edges of the elements of the connector assembly are of such radii as to afford a tight fit or, alternatively, the meeting surfaces may be provided with gaskets to insure air-tight or water-tight seals if occasion demands. Graphite grease is used to pack the bolts 8. Further, the connectors may be made of stainless steel, steel, plastic, or other suitable material depending on the material and structural use of the caisson or hollow and plane-surfaced sections. Obviously, when the connector elements are used to join planar sections, the elements of the connector will have to be configured accordingly.

A modified form of connector is shown in Figs. 7 through 10 and embodies a ring 26 welded as at 27, 28 or secured in any suitable manner to the interior surface of the caisson section 29 or other structural member. An arcuate flange member 30 is welded to the interior surface of a caisson section 32 as at 33 or may be secured thereto in any other convenient manner so that the depending portion 31 projects inwardly of the caisson section 32 and the remaining portion of the flange member 30 projects beyond the edge of caisson section 32 and projects, in assembled condition, into the upper caisson section 29 a distance depending upon the amount that the ring 26 is set back from the edge of the upper caisson section 29. Openings 34 are provided in the caisson section 29 in alignment with bores 34' in the ring 26 to receive bolts 35 which, when inserted in the holes or openings 34, are flush with the exterior surface of the caisson sections. The bolts shown are adapted to be turned by a socket wrench, but it is obvious that holes or openings 34 may be made large enough to accommodate other types of bolts. A washer 36 is welded to the shanks of the bolts 35. A recess 37 is provided on the interior vertical surface of the ring 26 to receive the washer 36. A plurality of hinge pads 38 each having slotted holes 39, are welded or otherwise secured at spaced intervals around the interior wall of the caisson section 29 a predetermined distance above the ring 26.

A series of arcuate channel-shaped members 40, having hinge blades 41, are bolted for free swinging motion as at 42 from the hinge pads 38. The channel-shaped members 40 each have an aperture 43 centrally of the web of the channel. The lateral travel of each of the nuts 45 is limited by the nut-keepers 46. A washer 47 also serving as a stop is held on the end of the threaded portion of each of the bolts 35 by screws 48. Flat guide plates 49 separating the members or segments 40 are located at spaced intervals around the inside wall of the caissons 29 and extend radially inwardly. The width of the channel-shaped members 40 between the legs thereof must be sufficient to span the combined longitudinal width of the ring 26 and the flange member 30 when the caisson sections 29 and 32 are in assembled position as in Fig. 8. Bevelled edges 50 and 51 are provided on the ring 26 and flange member 30, respectively, to facilitate engagement of the channel-shaped member 40 therewith when the caisson sections 29 and 32 are being drawn together by tightening of bolts 35. Fig. 8 shows the caisson sections 29 and 32 in assembled condition. As stated for the previous embodiment, the material used for the connector elements may be stainless steel, steel, plastic, wood or any suitable material depending upon the conditions under which the joined structures are to be exposed and the material of the structures being joined. The bolts 35 are packed with graphite grease. Further, if air or water-tight connections between the structures joined are desired, suitable gaskets may be used between the facing surfaces of the connector elements.

Having thus described my invention, what I claim as new and wish to secure by Letters Patent is:

1. A connector assembly for structural members comprising in combination with sectional units of a structure arranged in edgewise relation a first flange member secured adjacent a meeting edge of a first sectional unit, said first flange member having a gripping surface thereon, a second flange member secured to a second one of said sectional units adjacent a meeting edge thereof and having a gripping surface thereon in opposed said relation to the gripping surface on said first flange member, said first and second flange members including surfaces in contacting face relation when said first and second sectional units are adjacently located in assembled condition, support means carried internally by said first sectional unit adjacent an end thereof, a plurality of channel-shaped segments supported having rigid arms extending upwardly therefrom and hingedly connected to said support means by pin and slot means located in a plane parallel to said gripping surfaces for support of said segments and for bodily movements of said segments from and into gripping engagement with the gripping surfaces of said first and second flange members, fastening means passing through one of said flange members in a direction normal to the length of said assembled sectional units and engaging said channel-shaped segments in a direction normal to the width of said segments whereby when said fastening means is tightened said channel-shaped segments engage said gripping surfaces of said first and second flange members and bring said flanges into contacting relation drawing said first and second sectional units together to form a continuous structure.

2. A connector assembly for tubular structural members comprising in combination with sectional units of a tubular structure arranged longitudinally in meeting edge relation a first circular flange member secured adjacent an end of a first tubular sectional unit, said first circular flange member having a gripping surface projecting inwardly of said tubular sectional unit, a second circular flange member secured to a second one of said tubular sectional units adjacent an end thereof and having a gripping surface thereon in opposed relation to the gripping surface on said first circular flange member, said first and second circular flange members including surfaces in contacting face relation when said first and second tubular sectional units are longitudinally arranged in assembled condition, support means carried internally by said first tubular sectional unit adjacent an open end thereof, a plurality of arcuate channel-shaped segments having rigid arms extending upwardly therefrom and hingedly connected to said support means by pin and slot means located in a plane parallel to said gripping surfaces for support of said segments and for bodily movements of said segments from and into gripping engagement with the gripping surfaces of said first and second circular flange members, threaded means presenting a flush surface with and operable from the exposed surface of said tubular sectional units and passing through one of said circular flange members in a direction normal to the longitudinal axis of said first and second tubular sectional units and threadably engaging said arcuate channel-shaped segments in a direction normal to the width thereof whereby when said threaded means is tightened said arcuate channel-shaped segments engage said gripping surfaces of said first and second circular flange members and bring said circular flange members into contacting relation and drawing said first and second tubular sectional units together to form a continuous tubular column.

(References on following page)

References Cited in the file of this patent

UNITED STATES PATENTS

| | | |
|---|---|---|
| 180,781 | Morgan | Aug. 8, 1876 |
| 831,551 | Guttzeit | Sept. 25, 1906 |
| 1,254,497 | Green | Jan. 22, 1918 |
| 1,397,145 | Plummer | Nov. 15, 1921 |
| 1,708,528 | Voelker | Apr. 9, 1929 |
| 1,807,527 | Hanny | May 26, 1931 |
| 2,275,301 | Laurent | Mar. 3, 1942 |
| 2,393,078 | Wager | Jan. 15, 1946 |
| 2,456,744 | Sjoberg | Dec. 21, 1948 |
| 2,601,995 | Skopic | July 1, 1952 |
| 2,643,901 | Manoogian | June 30, 1953 |
| 2,793,779 | Woods | May 28, 1957 |

FOREIGN PATENTS

| | | |
|---|---|---|
| 724,766 | France | Jan. 30, 1932 |
| 495,140 | Great Britain | Nov. 8, 1938 |